HIRAM B. HOSSLER.
Improvement in Horse Power Fastenings.

No. 121,874.  Patented Dec. 12, 1871.

Witnesses

Hiram B. Hossler, Inventor
by Job Abbott, Attorney.

121,874

UNITED STATES PATENT OFFICE.

HIRAM B. HOSSLER, OF NEW BERLIN, OHIO.

IMPROVEMENT IN HORSE-POWER FASTENINGS.

Specification forming part of Letters Patent No. 121,874, dated December 12, 1871.

*To all whom it may concern:*

Be it known that I, HIRAM B. HOSSLER, of New Berlin, in the county of Stark and State of Ohio, have invented certain new and useful Improvements in Horse-Power Fastenings; and that the following is a full, clear, and exact specification thereof, which will enable others skilled in the art to make and use the said invention.

In the use of horse-powers for various out-door purposes, such, for example, as propelling a thrasher and separator, much difficulty has been encountered in fastening or staking the power firmly to the ground, particularly where the ground is stony, so as to make it difficult to drive the stakes down at the side of the power just where they should be to hold the power properly, or where the ground is soft or wet, so as to allow the stakes to be pushed or drawn over by the pressure from the power-frame.

My invention is designed to give to the farmer or thrasher a power-fastening of cheap and simple construction, which can be applied on any ordinary ground, and which will securely hold the power from moving sidewise or rising from the ground; and to this end it consists in the combination, with each end of the power-frame, of a tie-rod running from one frame piece over the opposite one, and united by a hook at its upper end with a stake-rod, which is secured to the ground at a short distance from the frame by an inclined stake driven through an eye at its end, said stake being braced at its upper end by a brace running to the top of the hook on the tie-rod.

Figure 1:
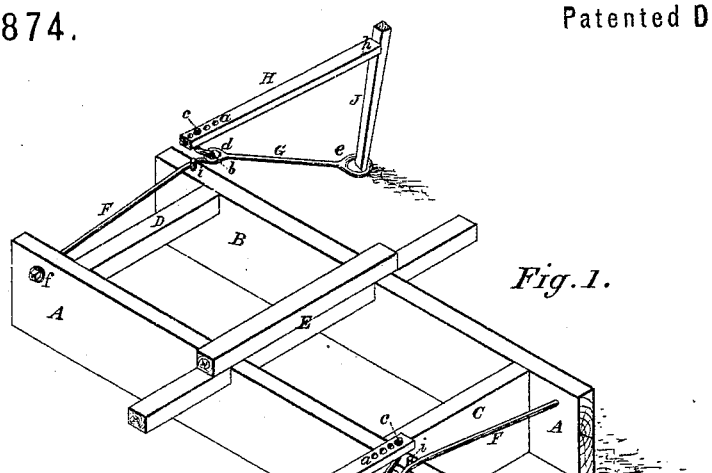
Figure 2:
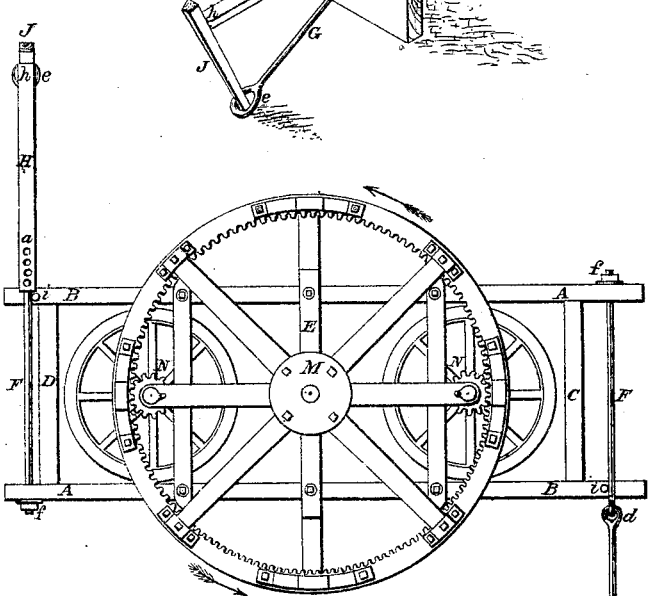
Figure 3:
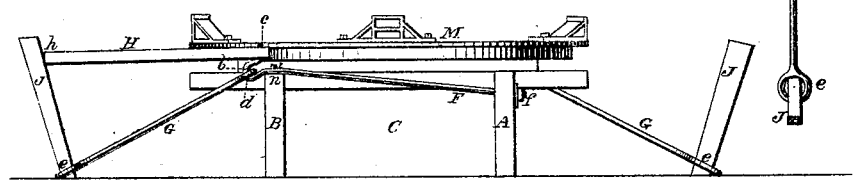
Figure 4:
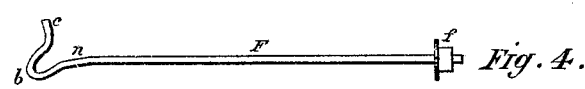
Figure 5:
Figure 6:
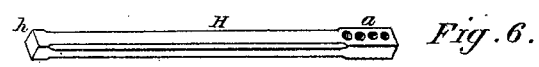

In the accompanying drawing, Figure 1 is a perspective view, showing an application of my invention. Figs. 2 and 3 are plan and end views of the same. Figs. 4 to 6 are detail views of the fastening devices.

A B A B are the side pieces of the frame, which are united by the cross-pieces C D E between, and on which is secured the gearing N M N, of any of the ordinary forms of circular horse-power gearing. The tie-rods F are run through the ends A of one of the side frame pieces, where they are secured by a nut and washer, $f$, and their upper ends extend across the ends B of the opposite side frame piece, the direction of the rod F from its lower end $f$ to its upper end being opposite to the direction of the rotation of the master-wheel M, indicated by arrows in Fig. 2. The portion $n$ of the rod F which rests on the frame end B can be flattened down, as shown, so as to bear squarely on the frame, and directly beyond it is bent the hook $b$, the upper end $c$ of which is bent into a vertical position, as shown in Figs. 1, 3, and 4. The stake-rod G has the eyes $d$ and $e$ formed at its ends, and is secured to the end of the tie-rod F by passing the eye $d$ over the hook $b$, as shown, the other end being fastened to the ground by a wooden or iron stake, J, which is driven through the eye $e$ into the ground in an inclined position, the inclination of the stake being away from the frame, as shown. The stake-brace H is usually made of wood, and has several holes, $a$, bored near its end, as shown in Fig. 6. After the stake J has been driven into the ground, as described, the operator takes the brace H and places it on the end of the tie-rod F into such a hole, $a$, in the brace H as will allow the end $h$ of said brace to bear on the upper part of the stake J, when, by pressing down on said end $h$, it is seen that the brace H will be pressed between the hook end $c$ and inclined stake J, as shown in Figs. 1 and 3.

On attaching the team to a power secured in the manner described, it is seen that the power frame will be held from revolving by the rods G G, which are in turn held by the inclined stakes J J; and it is also seen that the strain from the rods G cannot pull over the stakes J, as their upper ends are firmly held by the braces H; consequently no side movement of the power can take place without moving the stakes J through the ground in an erect position, which movement is not liable to occur under any ordinary draft.

It will also be seen that as the end $f$ of the tie-rod F is secured below the level of the hooked end $b$, and as the stake-rod G is inclined from said end $b$ down to the stake J, which is in turn inclined back to prevent the rod-eye $e$ from sliding up, the result of the draft on the rods F G will be to force the frame A B A B down to the ground and prevent any tendency of the draft to lift the frame, which downward pressure is further augmented by the combined action of brace H, stake J, and rod G, as will be evident to the mechanic. In order to allow the stake-rod G to be placed at a horizontal angle with the tie-rod F for the purpose of moving the stake J to the side of any obstacle to driving it in the ground, the stop-pins $i$ are placed in the top of the frame pieces A B, inside the tie-rods F, as shown in Figs. 1 and 2, to give a side bearing to the part $n$ of said tie-rod. These pins may serve as bolts for the rings usually placed on the frame for convenience in handling and transporting it, and will be found of great service, in combination with the tie and stake-rods, in staking down the power on a hillside, as will be readily seen.

Having thus fully described my invention, what I claim as new, and desire to secure by Letters Patent, is—

1. In combination with the stake-rod G or its equivalent, and the inclined stake J, the brace H extending from the frame A B to the upper end of stake J, substantially as and for the purpose specified.

2. The combination of the power-frame A B A B, tie-rods F F with hooks $b$, stake-rods G G with eyes $d$ and $e$, and inclined stakes J J, said tie-rods extending from a point below the top of one frame piece over the top of the opposite frame piece, and the several parts being arranged and connected substantially as specified.

3. The stay-pin $i$ in the frame A B, in combination with the tie-rod F, substantially as and for the purpose specified.

4. The tie-rod F, with hook $b$ at its end, having the vertical end $c$ thereon, in combination with the power-frame A B A B, substantially as and for the purpose specified.

5. The combination of the power-frame A B A B, tie-rod F with hook $b$ and vertical end $c$, stake-rod G with eyes $d$ $e$, inclined stake J, and brace H with holes $a$ therein, the several parts being arranged and connected substantially as and for the purpose specified.

As evidence of the foregoing witness my hand this 9th day of September, 1871.

HIRAM B. HOSSLER.

Witnesses:
JENNIE W. GRANT,
JOB ABBOTT.

(159)